Dec. 30, 1941.   W. J. PLEWS   2,267,747
DEHULLED, DISEMBITTERED, AND EXPANDED SOY BEANS AND
PROCESS FOR PRODUCING SAME
Filed Nov. 27, 1937

INVENTOR.
William J. Plews
BY
ATTORNEYS.

Patented Dec. 30, 1941

2,267,747

UNITED STATES PATENT OFFICE 2,267,747

DEHULLED, DISEMBITTERED, AND EXPANDED SOY BEANS AND PROCESS FOR PRODUCING SAME

William J. Plews, Chicago, Ill., assignor to Plews Processes, Inc., a corporation of New York Application November 27, 1937, Serial No. 176,901

7 Claims. (Cl. 99—98)

This invention relates to a method of treating soy beans and to the new products secured by this method. The method has been particularly devised to provide a palatable and nutritious soy bean kernel product for human consumption, but this product has numerous other possible uses, and the soy bean hulls obtained as a by-product from the method may also be turned to useful purposes.

It is well known that soy beans have until recently been unsatisfactory as an article of food, mainly because of the peculiar "beany" flavor which characterizes them when they are cooked in a way similar to that in which ordinary beans, peas, etc., are cooked. To overcome this difficulty many methods have been proposed, practically all of which involve some kind of heat treatment.

A survey of the prior art discloses that most, if not all, processes for disembittering, i. e., removing the "beany" flavor from soy beans, and for making them palatable may be grouped in one or more of the following classifications:

1. Heating the dry beans at 65° C. at atmospheric pressure for substantial periods of time.
2. Heating the beans with saturated steam at 70° to 100° C., either under vacuum or at atmospheric pressure for thirty minutes to several hours.
3. Treating the beans with various liquids:
    (a) Boiling them in water for many hours;
    (b) Steeping them in dilute sulphurous acid or water acidified with acetic acid;
    (c) Steeping them in a suitable warm liquid bath until their moisture content amounts to about 30%, then squeezing them flat and passing them in this condition between or over heated rollers.
    (d) Heating them in oil at 100° C. to 110° C. for five minutes;
    (e) Soaking them in 5% formaldehyde for twenty-four hours;
    (f) Soaking them in a salt and soda solution for thirty hours;
    (g) Soaking them in acidulated water for twelve hours;
    (h) Soaking them in solutions of sodium bicarbonate.
4. Dialysis of the bitter principle from the beans, using the skins as semi-permeable membranes.

It is desirable not only to remove the "beany" flavor from the soy beans, but also to remove the hulls substantially completely from the beans, to retain the proteins and other nutrient components in the beans in unimpaired condition, and to produce a food product for human consumption which is stable as to flavor and does not become rancid.

Soy bean kernels are enclosed in a thin but tightly adhering hull or skin which is substantially indigestible and which should be removed before the product is suitable for human consumption. In most of the processes heretofore proposed a separate step or steps are necessary in order to effect this. Treatment with water loosens the hulls and thus tends to remove them, but the process is usually quite incomplete unless the beans are alternately soaked and washed many times and for a great number of hours. Even if the hulls or skins are completely removed, the kernel must be dried before it can be stored or shipped. Furthermore, such lengthy treatment dissolves a certain amount of the natural fats, proteins and other nutrient components, and thus valuable nutritive materials are lost.

In some cases where water is not used for removal of the hulls, oil may be used for the same purposes. However, it then becomes necessary to remove the oil, as if this is not done the finished kernel product, besides having an objectionable oily taste, frequently becomes rancid.

In addition to treatment with water or oil, some processes resort to breaking or cracking of the beans to loosen the hulls. This is objectionable at least for the following reasons: First, an extra step is involved; second, it is impossible to produce anything from the beans so treated but granules or flour; third, in cracking the beans the hulls are partially shattered and it is difficult to separate the fine hull particles from the flour or granules; and fourth, even cracking the beans does not loosen all of the hulls.

Many disclosures of processes for treating soy beans emphasize that soy bean proteins are nutritionally impaired by high temperatures, and hence great precautions are generally taken to keep the temperatures below 200° F. to 220° F. The method of the present invention is not subject to this limitation, and proteins of excellent quality are obtained from soy beans subjected to temperatures greatly exceeding 212° F.

Although many present day processes of treating soy beans in order to render them suitable for human consumption are fairly successful in removing the characteristic "beany" flavor, they are not always entirely so, and many of them leave much to be desired from the standpoint of general edibility of the product. For example, some soy bean kernel products have a disagreeable oily taste and are very susceptible to the development of rancidity, particularly when ground to a flour. In addition, whole, split or granulated soy bean kernels, and to a lesser extent even soy flours, prepared by the conventional processes are harsh, brittle and non-friable. They are quite unpalatable and could not, because of their harshness alone, be successfully substituted for almonds, peanuts, walnuts and the like.

Even after the more or less complicated and time-consuming treatments suggested by the prior art outlined above, the final products in most cases are not ready for human consumption but must be subjected to further cooking to render them palatable.

There is apparently no known simple method of treating soy beans to make them into a palatable and nutritious food product for human consumption having all of the desirable characteristics referred to above. Moreover, even such results as are accomplished require excessive times, that may vary from five minutes to thirty hours, apart from such subsequent drying or removal of oil, separation of hulls, grinding, etc., as may be necessary.

Among the objects of my invention are to provide a method of treating soy beans in such a manner that the kernel product is free from any "beany" flavor; in which the hull is removed; in which the product is completely cooked; in which the product is easily friable between the fingers; in which it is free from micro-organisms; in which the product has a larger content of reducing sugars than raw soy beans or those treated by known methods; in which the protein content is unimpaired, and in which the product has a pleasing flavor and palatable consistency.

According to the present invention, a method entirely different from those now known is used which results in a new soy bean kernel product having all the desirable characteristics referred to above as well as certain additional ones, and in a new soy bean hull product capable of being put to useful purposes. The kernel product is free from any "beany" flavor; its hull has been removed; it is completely cooked; it is easily friable between the fingers; it is free from micro-organisms; it has a larger content of reducing sugars than raw soy beans or those treated by known methods; its protein content is unharmed; and it has a pleasing flavor and palatable consistency.

The method of the invention consists essentially in subjecting soy beans to substantial superatmospheric temperature and substantial superatmospheric external pressure by means of steam, and thereafter suddenly greatly reducing the external pressure on them.

This method may be carried out in a number of ways which are known per se in the treatment of cereals. One way is to heat moist soy beans (the moisture may be only that natural to them, but moisture is generally added as the natural moisture is generally insufficient) in a closed container, usually by rotating the container in an oven, until at least a part of the moisture is converted into steam and then suddenly opening the container. The time required for this treatment is about twelve minutes, using a chamber of a diameter of about 6 inches and a length of about 36 inches whose walls are already hot. Another way is to heat soy beans in a closed container until at least part of the moisture contained in them is converted into steam, then introduce steam under pressure into the container, after bleeding off some or all of the developed steam if the original moisture content was too high, having regard to the desired characteristics of the final products, and then suddenly open the container after the appropriate period of treatment which is generally about two or three minutes. The total time for this treatment, including that for the heating of the beans, is about six minutes, using a chamber of the same dimensions and in the same heated condition as that above. A third way, and the preferred way in that it gives the best results in the shortest time, is to place the soy beans in a closed container, introduce superheated steam at substantial superatmospheric pressure into the container and then suddenly open the latter after the appropriate time of treatment, which is between about 35 seconds and 5 minutes, depending upon the character of the final product desired.

Much the greater part of the experimental work on the method of the invention has been done in connection with the third and preferred way of carrying out the method, which will therefore be described in detail in connection with this preferred way. From the information concerning temperature, pressure and time given in connection with this way of carrying out the method, it will be possible for those skilled in the art to determine the correct pressures, temperatures and times to be used in carrying out the method of the invention in either of the other ways mentioned.

In the preferred way of carrying out the method, it is unnecessary that the soy beans be treated in any way before they are subjected to the action of the superheated steam. They are therefore placed in a raw state in the closed container which may be, for example, the chamber of the gun in the apparatus described in my application Serial No. 757,965, filed December 17, 1934. When the container has been closed, the superheated steam is admitted. After an appropriate time of admission, the length of which will be discussed more in detail below, the steam is shut off and the chamber generally immediately opened, whereby the external pressure on the beans caused by the pressure of the steam in the chamber is suddenly greatly reduced and the beans violently ejected from the gun in a dehulled and expanded condition. Although the chamber is generally opened as soon as the steam supply has been shut off, this is not always done. If the moisture content of the raw beans was high, having regard to that desired for the final products, the steam first admitted is wholly or partially bled off, carrying with it part of the original moisture content of the raw beans, and a new supply of steam then admitted, whereupon the chamber is suddenly opened with the results set out above.

It is almost impossible to set definite limits of temperature, pressure, and time within which the method may be carried out satisfactorily and outside which it fails. The reason is that there is at no point in a scale of gradually changing temperatures, pressures, and times, an abrupt change in the character of the product produced by the method, except one in the scale of increasing pressures at which the kernel is shattered. Moreover, the most suitable conditions of temperature, pressure, and time depend very largely upon the state and nature of the beans being treated and the character desired of the final product. A set of conditions which might give extremely satisfactory results for one lot of beans might on the contrary give unsatisfactory results for another lot.

A very large number of experiments has been made regarding the effect of various temperatures, pressures, and times in the preferred way of carrying out the method of the invention, the pressures having ranged from 50 to 300 pounds per square inch, superheats from 25° F. to 300° F. and times from 35 seconds to 5 minutes, with a chamber of a diameter of 6 inches and a length of 36 inches. From these it is possible to draw certain general conclusions.

Results of the treatment first show at pressures above about 50 pounds per square inch and are fair at pressures of about 100 pounds per square inch. They improve, for a given lot of beans, in a more or less linear manner with increasing pressures up to the pressure which will cause the beans to shatter. This pressure varies widely according to the nature and state of the beans. For example, beans of this year's crop will shatter at a lower pressure than old beans, and similarly beans whose moisture content is high will shatter at a lower pressure than those whose moisture content is low. Thus, it can be stated that to obtain the same volume of the kernel product, the pressure must be higher the drier and older, i. e., the denser, the raw beans are. It has, moreover, been found that the higher is the pressure the shorter will be the time and the lower the superheat necessary to obtain equivalent results. This rule holds good also for the time and for the superheat, that is, if the figure for any one of the three factors is increased, those for the other two factors may be lowered and about the same results obtained as before. The pressure is the factor which principally controls the amount by which the volume of the bean kernels is increased by the treatment, the higher the pressure the greater being the final volume. In commercial practice of the preferred way of carrying out the method, the pressure generally ranges between 175 pounds and 250 pounds per square inch, but if the beans are to be shattered, for example, when the final product desired is a soy flour, then pressures above about 250 pounds per square inch are used, depending on the freshness and moisture content of the raw beans, the usual pressure being about 300 pounds per square inch.

The degree of superheat of the steam is the factor which principally controls the dryness of the final products in comparison with that of the raw beans. It also is the factor which can be varied within the widest limits without substantially altering the character of the final products obtained. As a result of the experiments, it has been found that the drier the bean the lower will be the superheat necessary to obtain the same results. The range of superheats of between about 100° F. and 200° F. is that in which beans of the most varied character may be treated with success. Good results may be obtained with superheats of less than about 100° F., but there is always the danger of excessive condensation if the beans have too high a moisture content for the superheat chosen. In the same way good results may be obtained with superheats of over about 200° F. but here there is the danger of scorching if the moisture content of the beans treated is too low. In commercial practice of the preferred way of carrying out the method, the superheats range from about 100° F. to 200° F.

Time of treatment is the factor which principally controls the degree of cooking of the beans and the color of the final kernel product. The color deepens in almost direct proportion to the time of treatment, ranging from a rich yellow for a time of about 35 seconds, using the commercial ranges of pressures and superheats, to a deep coffee color for a time of about 5 minutes, using the same ranges of pressures and superheats. Experiments have not been made with times exceeding 5 minutes as there appeared to be no advantage in using longer times, since the desired range of products could be obtained without doing so. Using the commercial ranges of pressure and superheat above indicated, it is clear that with beans of ordinary character carbonization would take place if the time were extended much beyond 5 minutes. If a kernel product thoroughly cooked but very slightly increased in volume in comparison to a raw bean were desired, it might be advantageous to use a very low degree of pressure and superheat and a comparatively long time of treatment which might even exceed 5 minutes. However, it is the increased volume of the final kernel product which is responsible for many of its desirable characteristics.

The figures of pressure, superheat, and time given above are based on the use of a chamber of the dimensions indicated and will vary somewhat, particularly as to time, with chambers of varying sizes. The larger the chamber the longer will have to be the time to give equivalent results.

It is found that after the treatment described above, the hulls or skins of the beans are almost completely removed from the kernels, and may be completely so by blowing the mixture with a fan or by a suitable form of aspirator. When it is cool (no special steps are necessary to effect cooling), the final kernel product will be dry enough to be stored, granulated, ground into flour, or treated in any other desired manner. It is entirely edible without further heat treatment of any kind. It has lost the bitter and unpalatable taste of the raw beans and, in the case of any but a long time of treatment, possesses a pleasing nut-like flavor so that it may be substituted for peanuts, pecans, and similar products in the preparation of candies, cakes, cake fillings, biscuits, cookies, and the like. If the time of treatment has been long, i. e., between about 3 and 5 minutes, the product may be a palatable coffee substitute.

From the above description, it will be clear that the beans are subjected to a process known in the cereal treating art as an explosion process.

Prior experience with wheat, rice, and other cereals in an explosion process would lead an experimenter to the prediction that soy beans subjected to such a process would expand to many times their original size and that their hulls or skins would be disintegrated, adhering in small pieces to the surfaces of the expanded products, as in exploded wheat and rice. An examination of the so-called "puffed" wheat now on the market shows that the bran of the grains is not removed during the explosion process but is shattered and remains rather firmly attached to the expanded grains. Experiments with brown rice show the same result. On the other hand, wholly new and unexpected results are obtained from this point of view with soy beans. First, the soy beans do not expand to the same degree as wheat and rice grains under similar conditions, and second, the hulls of the beans are substantially completely removed without the kernels being shattered unless this is desired. For example, the use of a superatmospheric pressure of 225 pounds expands wheat to six or eight times its original size, whereas the use of the same pressure in the preferred way of carrying out the method of this invention expands soy bean kernels to between 150% and 250% of their original size and, at the same time, completely removes the hulls or skins without shattering the kernels.

The teachings in the prior art would lead an experimenter to believe that the high temperatures used in the method of this invention would destroy or seriously impair the nutritional value of soy bean proteins. The results of the method, however, show that high temperature alone does glass jars and also in other types of containers not air-tight, and have remained sweet and edible for several years. These products thus have a commercial shell life.

In the following table appear the results from treating a number of samples of soy beans by the preferred way of carrying out the method of the invention. Here the color of the final kernel product, the pressure, the total temperature, the time of treatment, and the solubilities of the protein in the final kernel product (higher protein solubility being generally considered to denote a better protein from the nutritional standpoint) are recorded. The samples are arranged in order of increasing depth of the color imparted to the treated product. It will be seen that as the time of treatment increases, the color deepens, and the protein solubilities increase.

| | Steam pressure | Approx. temp. | Time | Solubilities of protein in— | | | |
| --- | --- | --- | --- | --- | --- | --- | --- |
| | | | | 5% $K_2SO_4$ | 1% NaCl | 10% NaCl | 70% Alc. |
| | Lbs. per sq. inch | °F. | Sec. | Per cent | Per cent | Per cent | Per cent |
| Lt. brown | 200 | 450 | 35 | 9.8 | 10.5 | 9.4 | 3.1 |
| Do | 200 | 500 | 35 | 10.7 | 10.7 | 10.2 | 3.7 |
| Med. brown | 200 | 500 | 40 | 11.7 | 12.2 | 11.1 | 3.6 |
| Do | 200 | 450 | 45 | 11.8 | 12.4 | 11.0 | 3.6 |
| Do | 200 | 450 | 50 | 12.0 | 12.5 | 11.7 | 3.9 |
| Dark brown | 200 | 500 | 50 | 13.6 | 13.8 | 12.6 | 4.3 |
| Do | 200 | 450 | 55 | 11.2 | 14.1 | 12.4 | 4.5 | not impair protein quality. It is apparently the combination of fairly high temperature and generally very long treating time that causes such impairment, when the known methods of treatment are used. The proteins in the kernel product of the invention are nutritionally not only as valuable but actually more valuable than those in the raw beans, and in some cases even more valuable than those in beans which have been subjected to milder temperatures when processed in accordance with present known methods. Feeding tests made on rats have shown that they grow satisfactorily on a ration consisting of three parts of yeast, four parts of a standard salt mixture, two parts of cod-liver oil, and forty parts of flour made from the soy bean kernel product of this invention. In a series of tests in which the quality of the protein in soy bean kernel products of this invention was compared with the quality of the protein in soy beans cooked in hot oil by conventional methods and with the quality of the protein in raw soy beans, it was demonstrated that the greatest growth of the test animals was obtained on the ration containing flour made from the kernel product of this invention.

Soy beans treated at pressures and superheats within the commercial range above indicated and for relatively short times are substantially darker in color than before treatment, and yet they have a pleasing nut-like flavor free from any "beany" and burned taste. Either wheat or rice under conditions where the color becomes substantially darker than in the uncooked product is practically inedible because of the burned flavor.

Raw soy beans of good quality contain about 20% of oil, and it would be expected that when they are exposed to temperatures of 300° F., 400° F., or 500° F., such as may be used in the method of the invention, this oil would become rancid very quickly. However, soy bean kernel products of the invention have been stored in screw-cap glass jars and also in other types of containers not air-tight, and have remained sweet and edible for several years. These products thus have a commercial shell life.

A further feature of the soy bean kernel product of this invention is that it has a much larger content of reducing sugars than raw soy beans or those treated by known methods. For instance, a 10 gram sample of the flour of this invention contained 197 milligrams of reducing sugar as compared to 95 milligrams of reducing sugar in a similar quantity of soy bean flour now offered for sale commercially and prepared by another method. Reducing sugars are well known to be yeast stimulants and accordingly the use in baking formulae of soy flour prepared from the soy bean kernel product of this invention should reduce the time required for fermentation, or, alternatively, the amount of yeast required.

The physical structure of the soy bean kernel products of this invention is distinctly different from that of the products prepared by the methods now known and used. For instance, soy bean kernels treated by the method of this invention are not only free from hulls but are no longer hard and dense like the raw beans and most of those treated by known methods. They are relatively soft and porous and are easily friable between the fingers. Their texture and flavor are such as to allow their substitution for roasted peanuts or even toasted almonds in candy bars, chocolate covered candies and the like, particularly as their porosity and resultant high absorptive capacity permits easy incorporation of added flavoring materials. From these treated whole soy bean kernels, granulated products or flour may be prepared by conventional methods.

Bread baked from blends of ordinary soy bean flour and wheat flour often develops mould and rope, owing not only to the presence of microorganisms in the soy flour, but also because soy bean breads are usually more moist and hence the organisms have a better medium upon which to grow. Thus, it is particularly important to have soy blends free from bacterial or mould contamination. High temperatures will not destroy some of these micro-organisms, such as rope spores which grow at oven temperatures, and the use of high temperatures in known methods to destroy other micro-organisms has impaired protein quality in the final product. However, owing to the unique features of the method of this invention, all micro-organisms are destroyed, and at the same time the protein quality of the soy bean is either unimpaired or improved. This novel result is probably due to the sudden release of the superatmospheric pressure causing disruption of the individual microorganisms.

In order to understand more fully the nature of the products of the invention and how they differ from the raw beans, reference may be had to the accompanying drawing in which.

Figure 1:
Figure 1 is a view showing dry raw soy beans.

By referring to Figure 1, it will be observed that the raw soy beans, which are shown in full size, possess a shiny appearance. This is imparted by the hulls or skins which adhere tightly to the kernels, and are quite thin and lustrous. Generally, they adhere so firmly that they prevent the kernels from splitting. The kernel of a raw soy bean is hard and brittle, and it is a tedious procedure to remove the hull even with a penknife.

Figure 2:
Fig. 2 is a view showing the whole soy bean kernel product of this invention.

In Fig. 2 it will be observed that the soy bean kernel products of the invention, which are shown in full size, are about one and one-half to two and one-half times the size of the raw beans and considerably darker in color than the latter. The skins or hulls have been completely removed from the kernels and do not adhere in small pieces to the surfaces of the expanded kernels as in the case of the hulls or skins of wheat and rice. The soy bean kernels after treatment are generally not split, and possess a regular form or shape resembling somewhat their original form except that they have been expanded. On tasting the products, such as are illustrated in Figure 2, it will be found that they are fully cooked, dry and disembittered, not hard or brittle but easily reducible in the mouth to a smooth paste, and that they possess a palatable nut-like flavor.

Figure 3:
Fig. 3 is a view showing the soy bean hull product of the invention.

Fig. 3 illustrates in full size the hull products of the invention after they have been separated from the kernels during the treatment. They are darker in color than the expanded kernels of Fig. 2; are very dry and brittle until moistened, and have extremely high capacity for absorbing moisture. They are generally not broken down into dust-like particles, but each portion appears to be approximately one-half of the hull that originally surrounded the dry raw soy bean.

This hull product has been found by experiments to have most surprising and useful characteristics as a bulking agent in the relief of constipation owing to its high absorptive capacity and complete lack of abrasiveness. It acts in the same way as agar agar or psyllium seed and has in fact proved superior to the latter in tests. It has, in addition, certain advantages over either of those products in that it is obviously entirely sterile owing to its method of production and in that it is sufficiently palatable to be eaten with cream and sugar in the same way as dry breakfast cereals, either alone or mixed with the latter.

While whole soy beans have been discussed, the method may be applied, if desired, to cracked or granulated soy beans. It is not necessary in treating these to screen out the broken or granulated beans, but the entire lot may be processed without regard to the physical structure of its separate units.

The kernel product of the invention, although it has been developed principally as an article of food, may very well have other uses also. Thus, for example, it provides a much more satisfactory initial material for the preparation of adhesives from soy beans than the preparations such as soy bean cake now used, and should be just as cheap to prepare.

Further modifications will be apparent to those skilled in the art and it is desired, therefore, that the invention be limited only by the prior art and the scope of the appended claims.

Having thus described my invention, what I claim and desire to secure by Letters Patent is:

1. The method of producing from soy beans a dehulled, disembittered, cooked and expanded product suitable for human consumption, characterized by an enhanced reducing sugar- and soluble protein content, friability, and freedom from heat-stable micro-organisms such as rope-forming spores, which method comprises subjecting soy beans in a closed container to steam at a pressure of about 50 to 300 pounds per square inch for a period of about 35 seconds to 5 minutes, and thereafter suddenly greatly reducing said pressure by opening said container.

2. The method of producing from soy beans a dehulled, disembittered, cooked and expanded product characterized by an enhanced reducing sugar- and soluble protein content and freedom from spores of a rope-forming micro-organism, which method comprises subjecting soy beans of commerce in a closed container to steam superheated from about 25° to about 300° F., at a pressure of about 50 to about 300 pounds per square inch for a period of about 35 seconds to about 5 minutes, and thereafter suddenly greatly reducing said pressure by opening said container.

3. The method of producing from soy beans a dehulled, disembittered, expanded product having a pleasing nut-like flavor and characterized by an enhanced reducing sugar- and soluble protein content and freedom from micro-organisms, which method comprises subjecting soy beans in a closed container to steam superheated from about 25° to about 300° F. at a pressure of about 50 to about 300 pounds per square inch for a period of about 35 seconds to about 3 minutes, and thereafter suddenly greatly reducing said pressure by opening said container.

4. The method of producing from soy beans a dehulled, disembittered, expanded product having a coffee-like flavor and aroma, and characterized by an enhanced reducing sugar- and soluble protein content and freedom from micro-organisms, which method comprises subjecting soy beans of commerce in a closed container to steam superheated from about 25° to about 300° F. at a pressure of about 50 to 300 pounds per square inch for a period of about 3 minutes to about 5 minutes, and thereafter suddenly greatly reducing said pressure by opening said container.

5. A palatable, disembittered, dehulled, cooked, explosion-expanded soy bean product characterized by friability, a reducing sugar-content of at least 15 milligrams per gram of product, and a high diastatic value, said product being obtained by exploding raw soy beans.

6. A palatable disembittered, dehulled, cooked, expanded soy bean product characterized by a pleasing nut-like flavor, enhanced reducing sugar-content and high diastatic value, obtained by subjecting soy beans of commerce to steam superheated from about 25° to about 300° F., at a pressure of about 50 to about 300 pounds per square inch for a period of about 35 seconds to about 5 minutes, and thereafter suddenly greatly reducing said pressure.

7. A disembittered, dehulled, cooked, explosion-expanded soy bean product characterized by a reducing sugar-content of at least 15 milligrams per gram of product, and possessing a coffee-like aroma and flavor, said product being obtained by the explosion treatment of raw soy beans.

WILLIAM J. PLEWS.